INVENTORS
DANIEL J. EISENSTADT,
DELMER P. SMITH
BY Stevens, Davis, Miller & Mosher
ATTORNEYS INVENTORS
DANIEL J. EISENSTADT
DELMER P. SMITH
BY Stevens, Davis, Miller & Mosher
ATTORNEYS

ERROR COMPENSATED FREQUENCY DISCRIMINATOR SYSTEM

Filed March 20, 1967 4 Sheets-Sheet 3

INVENTORS
DANIEL J. EISENSTADT,
DELMER P. SMITH

BY
Stevens, Davis, Miller & Mosher
ATTORNEYS

ERROR COMPENSATED FREQUENCY DISCRIMINATOR SYSTEM

Filed March 20, 1967 4 Sheets-Sheet 4

INVENTORS
DANIEL J. EISENSTADT,
DELMER P. SMITH

BY Stevens, Davis, Miller & Mosher
ATTORNEYS 3,497,632

ERROR COMPENSATED FREQUENCY DISCRIMINATOR SYSTEM

Daniel J. Eisenstadt, Fort Lauderdale, and Delmer P. Smith, Pompano Beach, Fla., assignors to Airpax Electronics Incorporated, Fort Lauderdale, Fla., a corporation of Maryland Filed Mar. 20, 1967, Ser. No. 624,420
Int. Cl. G11b 5/02
U.S. Cl. 179—100.1 10 Claims

ABSTRACT OF THE DISCLOSURE

A frequency discriminator system including a data channel with a data frequency discriminator comprising a square loop saturable transformer feeding a full wave rectifying diode bridge for producing constant amplitude constant width pulses the repetition rate of which corresponds with the data signal frequency, a reference channel including a reference signal discriminator developing an error signal which is applied through a fifth diode to one of the bridge terminals so that the error signal is algebracially added to the generated pulse amplitude. The fifth diode and bridge diodes forward voltage characteristics prevent the error signal from significantly affecting the energy content of the pulse train except during pulse generation.

Background

The present invention relates to error compensated frequency discriminator systems such as the type used in FM/FM telemetry systems.

It is common practice to monitor several physical characteristics of an operating apparatus, such as an airplane or the like, and record the information in the form of a frequency modulated subcarrier which may in turn be modulated on a carrier signal of suitable frequency. Each subcarrier has a base or center frequency spaced from the others. To reproduce the desired information, it is conventional to employ a playback unit which "reads" the recording medium and regenerates the data signals which are then applied to an appropriate number of data channels each having a band pass filter which selects the corresponding subcarrier frequency data signal. The selected data signal is then applied to a frequency discriminator which produces at its output a DC signal, the amplitude of which corresponds with the information content of the data signal. It has been found that speed variation in the recording and playback units, sometimes referred to as "wow" and "flutter," further frequency modulates the data signals and consequently introduce an error factor which appears in the output signals.

Early attempts to compensate this error introduction involved techniques of sensing speed variations in the recording or playback units and controlling the drive mechanism in the opposite sense of the variation. However, the demand for more sophisticated systems resulted in the development of compensation techniques which adjust electronically the electronic signals within the discriminators whereby the methods of compensation are independent of subcarrier signal deviations and magnitudes of speed variations. To this end, a reference signal of fixed frequency is recorded on the medium along with the data signals. During playback the reference signal is fed to a reference frequency discriminator channel the output of which represents net frequency errors common to all the other data signals.

According to one known technique, the error signal applied to a data frequency discriminator controls the pulse width of the pulse train produced by the multivibrator discriminator. Another system includes frequency discriminators having a constant width generator (in the form of a one-shot multivibrator or the like) feeding a limiter, a low pass filter and an output terminal in that sequence. Error compensation is obtained by applying the error signal from the reference channel to either the constant width generator to affect the pulse widths or the limiter to adjust the pulse amplitudes. But this technique suffers from having a non-linear compensation characteristic over the dynamic range of operation.

The present invention provides a system of the type described which achieves linear error compensation by providing a magnetic constant volt second pulse generator as the discriminator followed by a summing network effecting error compensation by varying the height of the pulses. Delay matching is accomplished by passive delay lines. Although the invention achieves linear error compensation over the operating range, it accomplishes this at a sacrifice of producing in the output signal a small error, the magnitude of which is not dependent upon carrier deviation. This residual error is small and is dependent only upon the amount of tape speed error. For the case where one example of the invention is adjusted for perfect compensation at speed errors approaching zero, a theoretical improvement of 40 db is available at 1% speed error and at 3% error (the maximum for which most compensation systems are designed) a theoretical 30 db improvement is provided. Thus, it can be seen that the advantage of linear compensation afforded by the inventive amplitude compensation following the discriminator stage far outweighs the insignificant error magnitude appearing in the output signal.

Briefly stated the inventive data discriminator includes a limiter receiving the data signal and applying its output to a drive circuit which drives a square loop transformer into forward and reverse saturation depending upon the output polarity of the drive circuit. In this way, constant width-constant amplitude pulses are produced on the secondary of the square loop transformer. By virtue of the physical (fixed) parameters of the transformer, the fixed pulse width preferably is approximately 25% of the data signal base period. The secondary is connected to a full wave rectifying diode bridge the output of which is integrated, amplified and applied to the data channel output terminal. According to another aspect of the invention, the error signal developed in the reference channel discriminator is delayed by a passive line and fed through a fifth diode to one terminal of the bridge so that during pulse generation, the error signal is algebraically added to the pulse amplitude. The forward voltage drop across the diodes prevent the error signal from significantly altering the pulse train average energy level except *during* generation of the pulses. According to another aspect of the invention, means are provided for generating an adjusting current which is summed with the signal eminating from the diode bridge so as to balance the same to a predetermined value when the signal received at the channel input is at the center frequency. According to still another aspect of the invention, the composite signal fed to the data channels may be delayed in the event the reference signal frequency is lower than the center frequency established for the reference channl frequency discriminator.

Other and further features of the invention will become apparent with the following detailed description when taken in view of the appended drawings in which.

Detailed description of embodiments

Figure 1:
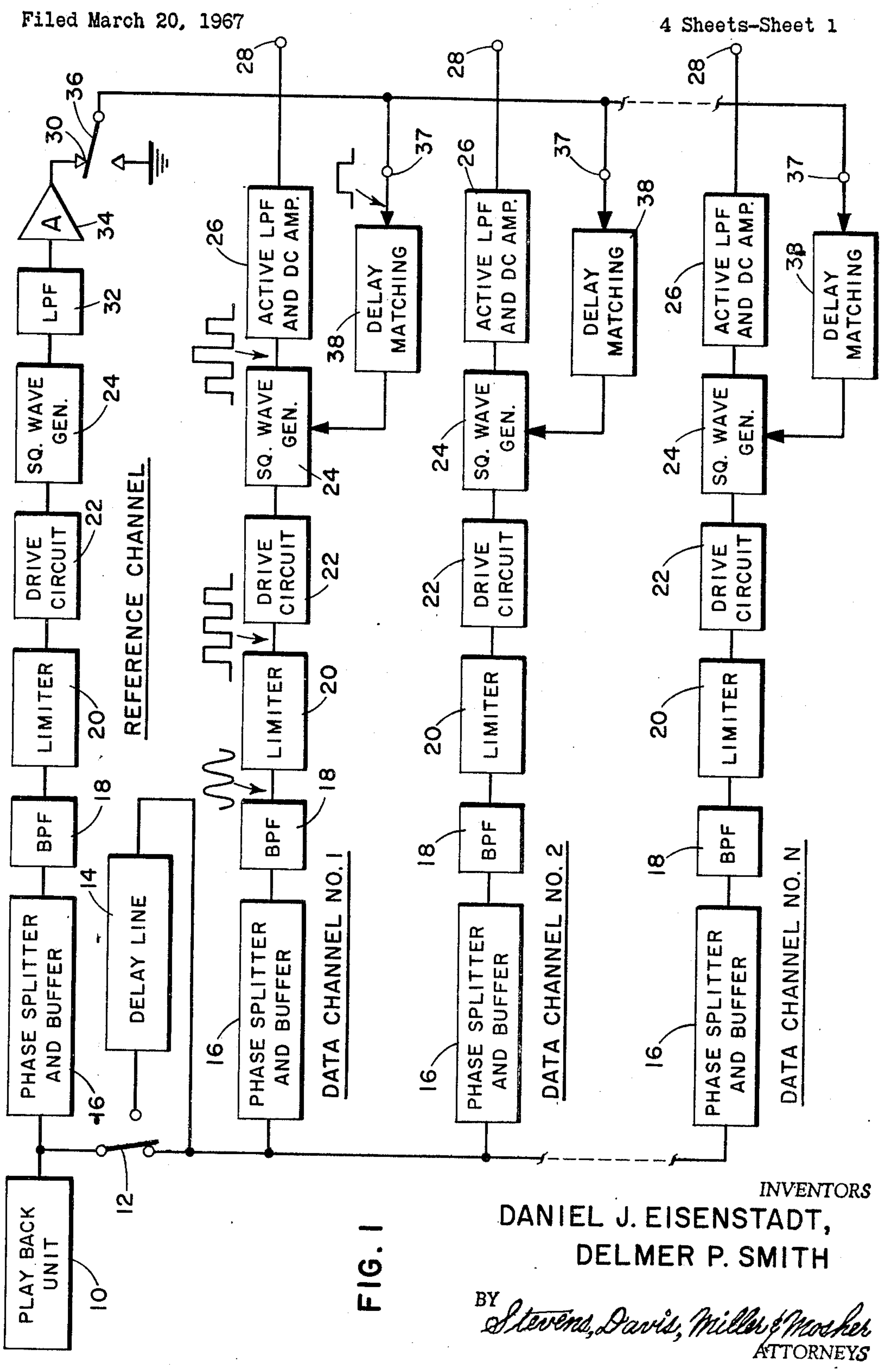
FIGURE 1 is a general block diagram of the system according to the invention.

With reference to FIGURE 1, the system according to the invention is arranged for handling signals such as those obtained in an FM/FM telemetry system wherein, in the conventional manner, a carrier signal is frequency modulated with a plurality of frequency modulated subcarrier signals and a reference signal of fixed frequency. The preferred embodiment of the system includes a standard playback unit 10 which reads the recorded medium and reproduces a composite signal as stated. The recording medium and playback unit 10 may be standard pieces of telemetry equipment such as magnetic tape and appropriate tape read apparatus.

The composite signal developed by playback unit 10 is fed to the inputs of the reference channel and each of N data channels as illustrated. For reasons described below, switch 12 may be operated to feed the composite signal through a delay line 14 before it reaches the data channels. Each data channel includes a phase splitter and impedance matching or buffer stage at input thereof which feeds a band pass filter 18 adjusted to the center frequency of the appropriate pass band for the corresponding subcarrier signal. By virtue of the high input impedance of buffer stage 16, the interaction between signals at different center frequencies is reduced on the respective data channels. In accordance with conventional techniques, filter 18 is designed to have constant delay characteristics and a generally flat amplitude response. Filter 18 passes only those signals within a predetermined pass band so that the filtered signal comprises the corresponding subcarrier signal frequency modulated with the pertinent information as well as any error signal common to all channels developed as a result of recording and reproducing drive speed errors, otherwise known as "wow" and "flutter." The signal from band pass filter 18 is applied to limiter 20 which develops a symmetrical square wave train of predetermined peak-to-peak amplitude having a frequency determined by the subcarrier signal frequency. The square wave operates a drive circuit which in turn drives a square wave generator 24 which produces a train of constant width, constant amplitude pulses having a repetition rate or frequency corresponding to the subcarrier frequency. The signal from square wave generator 24 is then averaged and amplified and in one preferred embodiment these functions are performed by an active low pass filter and DC amplifier 26 so that the signal at the data channel output 28 is in the form of a DC signal the amplitude of which represents the information content of the subcarrier signal. This channel output signal may be used to operate a suitable utilization device (not shown) such as a recorder pen or the like.

As mentioned above, all error speed variations in the recorder or playback unit 10 impart a corresponding error component to the composite signal which error appears on all subcarrier signals and the reference signal within each channel. As is now conventional in the art, the present system includes a reference channel which operates in response to the reference signal for developing a DC signal at its output 30 the amplitude of which is representative of the variations in speed of the recording unit or playback unit 10 relative to the predetermined correct speeds.

In order to develop the error signal at output 30, the reference channel includes the same components as each of the data channels; however, the square wave generator is of different design and it is preferred to use a passive low pass filter 32 coupled to the square wave generator and feeding a DC amplifier 34 which is in turn coupled to output 30. Low pass filter 32 reduces the subcarrier ripple frequency and attenuates adjacent channel beats in the event that the reference frequency signal is recorded on the same tape track as the data signals. Filter 32 should have a maximally flat delay configuration and its low pass characteristics have a fixed relation to the chosen reference signal center frequency. The output of low pass filter 32 may be coupled to the inverting input of the operational type DC coupled output amplifier 34 which is arranged with negative feedback to create a virtual ground at the input base thereof and provides resistive termination for low pass filter 32. It is preferred that DC amplifier 34 have a zero set capability so that the output is zero in response to a reference signal having a center frequency characteristic.

According to the invention, the error signal at output 30 is fed to all data channel error signal input terminals 37 through an appropriate synchronizing delay matching circuit 38 in each data channel and then to the associated square wave generator 24. By virtue of the data channel square wave generator design, the resulting square wave signal is amplitude compensated so as to increase or decrease the instantaneous volt-second characteristics of the square wave. In this way, the error components of all subcarrier data signals are compensated resulting in a corresponding compensation in the output signal developed at the channel outputs 28. In the event error speed compensation is not desired, switch 36 is connected to ground.

The data channel

Figure 2:
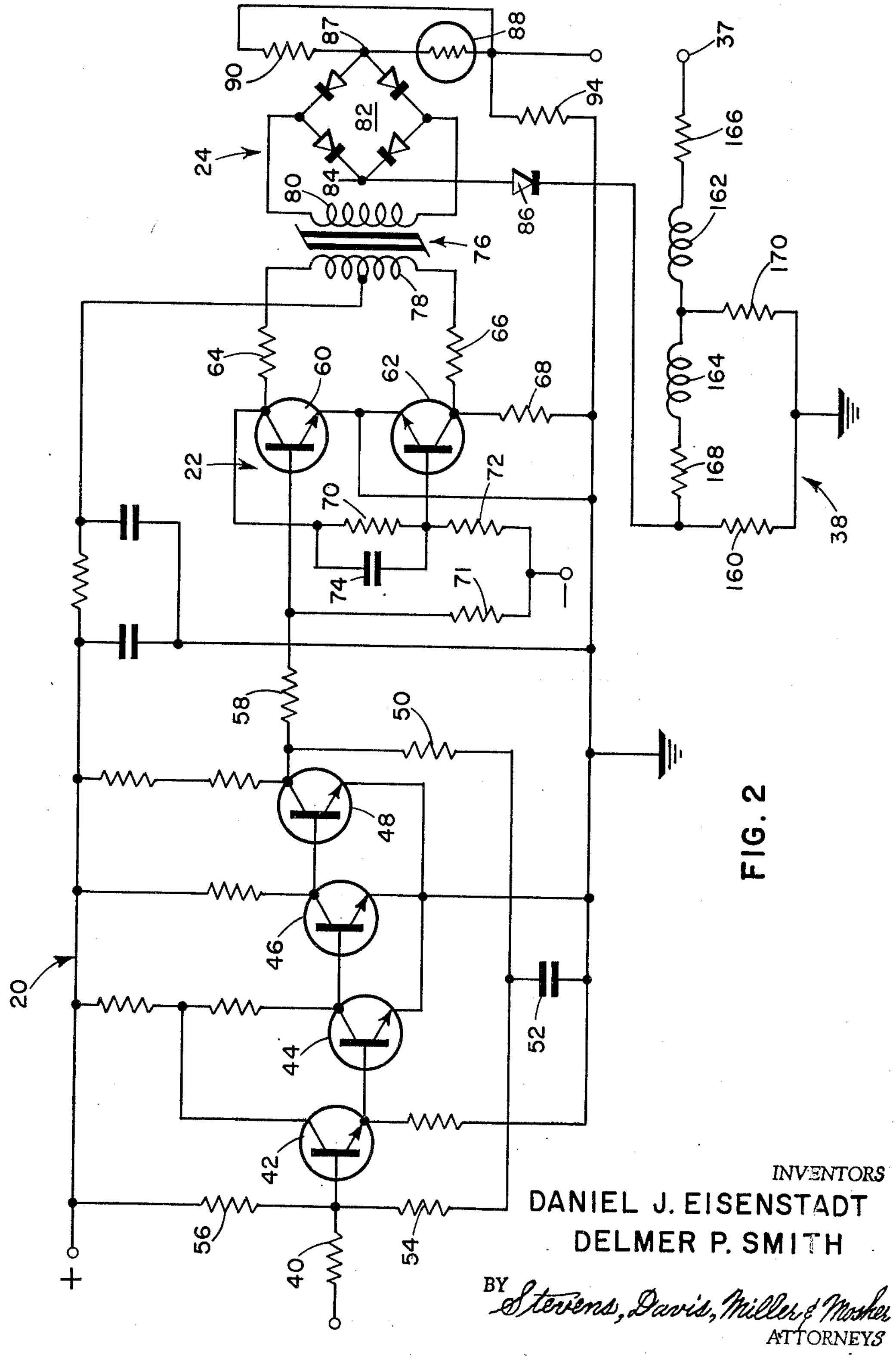
FIGURE 2 is a schematic diagram of the limit, drive circuit, square wave generator and delay matching network of a data channel of FIGURE 1.

The data channel limiter 20, drive circuit 22, and square wave generator 24 may have any suitable forms in carrying out the functions outlined above. In FIGURE 2 there is illustrated one preferred and working embodiment of these circuits. It should be understood that all values hereinafter mentioned are representative only and do not limit the invention thereto. The input of limiter 20 is direct coupled through resistor 40 to the output of the band pass filter 18. The limiting amplifier 20 includes four cascaded transistors 42, 44, 46 and 48 connected generally as shown so as to amplify a received sinusoidal signal of 300 mv. peak-to-peak to a constant amplitude square wave at the output collector of transistor 48 with minimum value of +.25 volt and maximum at about +8 volts. The DC operating point for limiter 20 is stabilized by a feedback network including resistor 50, capacitor 52 and resistor 54. Since the feedback is effective only at very low frequencies, full gain of the cascaded stages is available for all signal frequencies. Since one or more stages of limiter 20 will be limiting when the channel input amplitude is within the rated range, for example, 10 mv. to 10 v. RMS, the output on the collector of transistor 48 will be a square wave of essentially constant amplitude.

Transistor 42 has its base coupled to the positive power supply (+18 volts) through bias resistor 56. The emitters and collectors of transistors 42–48 are coupled to the positive power supply and ground by the various collector and emitter resistors generally as shown.

The 8-volt square wave output signal is coupled directly through resistor 58 to the input of the drive circuit 22 which in one example is a multivibrator circuit comprising transistors 60 and 62 having their emitters connected together and mutually connected to ground and their collectors coupled through current limiting resistors 64 and 66 to the inputs of the square wave generator 24. The collector of transistor 62 is coupled to ground through resistor 68 and the collector of transistor 60 is coupled to the negative power supply (−18 volts) through a pair of series resistors 70 and 72 the junction of which is connected to the base of transistor 62. Capacitor 74 is connected in parallel with resistor 70. A bias resistor 71 supplies negative bias to the base of transistor 60.

The square wave generator is preferably in the form of a Magmeter and includes a saturable core, square loop transformer 76 with a primary winding 78 closing the loop between resistor 64 and 66. The positive power supply is connected to the center tap of primary winding 78. The secondary winding 80 is connected to opposite terminals of a full-wave rectifying diode bridge 82, one of the other terminals 84 of which is coupled through a fifth diode 86 to the delay matching circuit 38. The bridge output terminal 87 supplies a thermistor 88, which may be of the disk-type used for temperature compensation, in parallel with resistor 90. Square wave generator 24 output terminal 92 is connected in shunt with resistor 94.

In operation, when the discriminator data channel input amplitude exceeds a predetermined level, for example, 10 mv. RMS, the signal at the collector of transistor 48 reaches a peak of about +8 volts which is coupled through resistor 58 to overcome the bias on the base of transistor 60 thus turning transistor 60 on. This action completes a current path from the positive power supply through one-half of the primary winding 78, through resistor 64, transistor 60, to ground. During this time, transistor 62 is held in the cut-off condition by the negative bias supplied through resistor 72.

With a passage of a fixed period of time determined by its design, for example, of about 25% of the limiter square wave full period, the core of transformer 76 saturates. During saturation, there is no change in the flux field and the signal on the secondary 80 drops back to zero. Transistor 60 continues to conduct until the square wave of the collector of transistor 48 falls back toward zero. When the voltage on the base of transistor 60 becomes negative by virtue of the positive power supply acting through resistor 71, transistor 60 is switched off. With the rapid rise of the transistor 60 collector voltage (toward the positive power supply level), a positive pulse is fed through capacitor 74 and resistor 70 to reverse the bias on transistor 62 and switch this transistor on. This action reverses the magnetomotive force applied to the toroidal core of transformer 76 and the flux builds up in the opposite direction until the core is again saturated. Transistor 62 continues to conduct until transistor 60 is again switched on by the appearance of a net positive bias on its base derived from the limiter output signal at the collector of transistor 48. When transistor 60 is switched on, its collector voltage drops, thus removing the forward bias from the base of transistor 62, thus initiating a completely new cycle of operation.

The Magmeter including the square loop transformer 76 generates constant volt-second pulses which are full-wave rectified by the diode bridge 82. The result is a pulse train with average value directly proportional to the associted subcarrier frequency. Because the discriminator stability is primarily dependent on the Magmeter circuit, it is preferred that transformer 76, diode 86 and the diode bridge 82 as well as thermistor 88 be included in a hermetrically sealed, silicon-filled can for optimum protection, thermal coupling and low temperature rise. In one example, the Magmeter is designed to produce an average output voltage of 10 volts DC at center frequency of the channel in use. Since the output is directly proportional to frequency, average DC will vary 100 mv. per percent deviation from center frequency.

Figure 3:
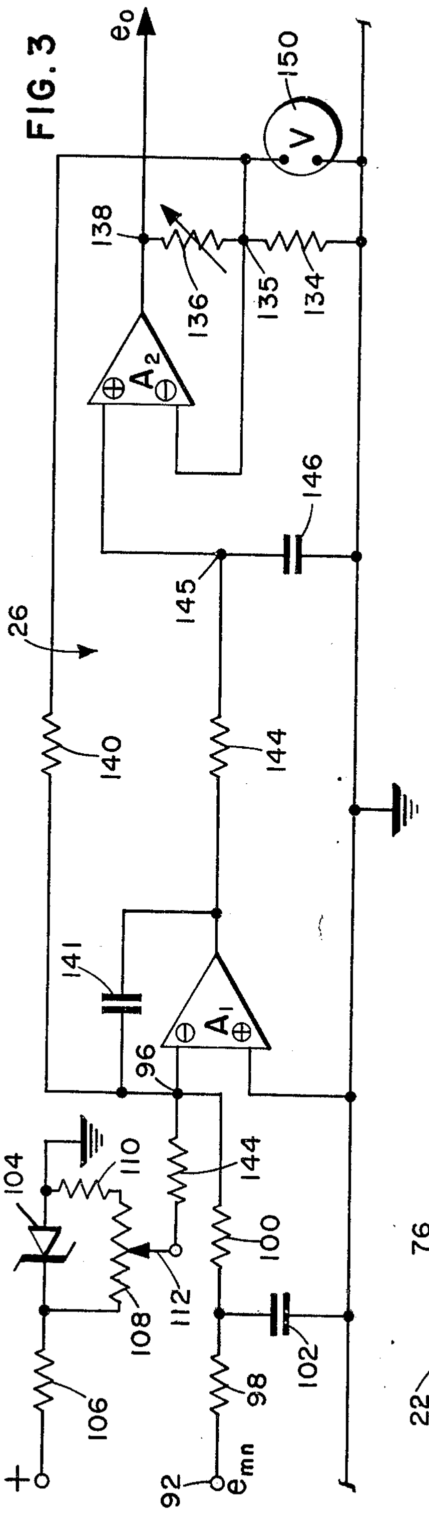
FIGURE 3 is a semidiagrammatic illustration of the data channel active low pass filter and DC amplifier.

Referring to FIGURE 3, the Magmeter output current is coupled to the active low pass filter and DC amplifier input terminal 96 through a network including a pair of series resistors 98 and 100 and shunt capacitor 102 connected to the resistor junction and ground. In order to develop zero input to terminal 96 when the Magmeter is operated at center frequency, a current is added to terminal 96 which is equal and opposite to the Magmeter output at center frequency. This current is provided by a reference voltage Zener diode 104 having one electrode grounded and its other electrode connected in series through resistor 106 to the positive power supply. The junction of diode 104 and resistor 106 is connected to a voltage divider including series resistors 108 and 110 connected to ground. The amount of current is selected by adjusting movable tap 112 which feeds terminal 96 through an appropriate resistance 114.

Amplifiers $A_1$ and $A_2$ may include a number of direct coupled transistor stages. In the example as stated above, the Magmeter output is 100 mv. per percent deviation. With the discriminator specifications calling for the output to be adjustable from plus or minus one to plus or minus ten volts peak at maximum deviation, it can be seen that the amplifier gain should be higher for channels thaving smaller maximum deviation. For this reason, the amplifier gain is controlled by virtue of the voltage divider formed by resistor 135 in series with potentiometer 136 which, in turn, is connected to the output terminal 138 of amplifier $A_2$. In addition, a feedback resistor 140 is coupled from potentiometer tap 136 to the input terminal 96 of amplifier $A_1$. These gain control networks cooperate to provide about 20 db feedback variation thus establishing a 10–1 output voltage control range. Resistor 140 is a fixed gain multiplier which provides for an overall gain range appropriate to the channel deviation percentage. The value of resistor 140 should be selected not only to provide the desired cutoff frequency but also to establish the desired carrier frequency deviation as well.

In operation, the signal from the Magmeter is coupled to the inverting input of amplifier $A_1$ through the network including resistors 98 and 100 and capacitor 102 which together determines one pole location. Resistor 140 and capacitor 141 determine a second pole location, and resistor 144 and capacitor 146 determine a third pole location. By appropriate selection of values, constant amplitude, constant delay or transitional configurations can be achieved.

Amplifier $A_2$ is connected to terminal 145 for high input impedance at the noninverting input so as to serve as a buffer to isolate the output 138 from the time constant of resistor 144 and capacitor 146. In addition, amplifier $A_2$ serves to raise the power output.

Potentiometer 136 in cooperation with resistor 134 permits a 10–1 overall amplifier gain variation. However, the gain with respect to the junction 135 is fixed. For this reason, junction 135 provides a reference point for the connections of a deviation meter 150 the deflection of which will be only a function of input deviation, regardless of gain control setting.

The voltage gain from terminal 92 to terminal 135 is equal to $$\frac{R140}{R98+R100}$$

While the overall voltage gain to terminal 138 is approximately equal to:

$$\left(\frac{R140}{R98+R100}\right)\left(\frac{R136}{R136+R134}\right)$$

The reference channel

It has been previously stated that the output of saturating transformer 76 is a train of constant amplitude, constant width pulses rectified average amplitude of which, for example, is equal to 10 v. D.C. at center frequency. Since output voltage is proportional to input frequency, the output varies, for example, 100 mv. per percent frequency change. Thus an effective variation of 1% in tape speed (sum of record and playback errors) can produce a substantial error in terms of percentage of bandwidth. For example, the error introduced into a ±7½% deviation channel (full scale=15% of center frequency) amounts to one part in fifteen or 6.7%. Tape speed errors degrade narrower band channels even further while wide band channels are effected proportionally less.

By recording a known constant frequency (reference frequency) on the tape simultaneously with the data, it is possible to obtain a signal which at any instant corresponds to the overall speed error. This is accomplished by selecting and demodulating the reference frequency in the reference discriminator channel particularly designed for this purpose.

A common reference frequency for use at tape speed of 60 i.p.s. is 100 kHz. If the record and playback speeds are identical, this reference frequency will be reproduced as 100 kHz., but if the playback speed is greater or less than the record speed, the reproduced frequency will be respectively higher or lower by exactly the same percentage. If the reference frequency is now fed to a reference channel discriminator whose output is 0 at 100 kHz. and positive at higher frequencies and negative at lower frequencies, the output of this discriminator corresponds to the magnitude and direction of the effective tape speed error. The reference channel discriminator provides this function and its output is adjusted to be approximately 800 mv. per percent deviation of the reference frequency.

Figure 4:
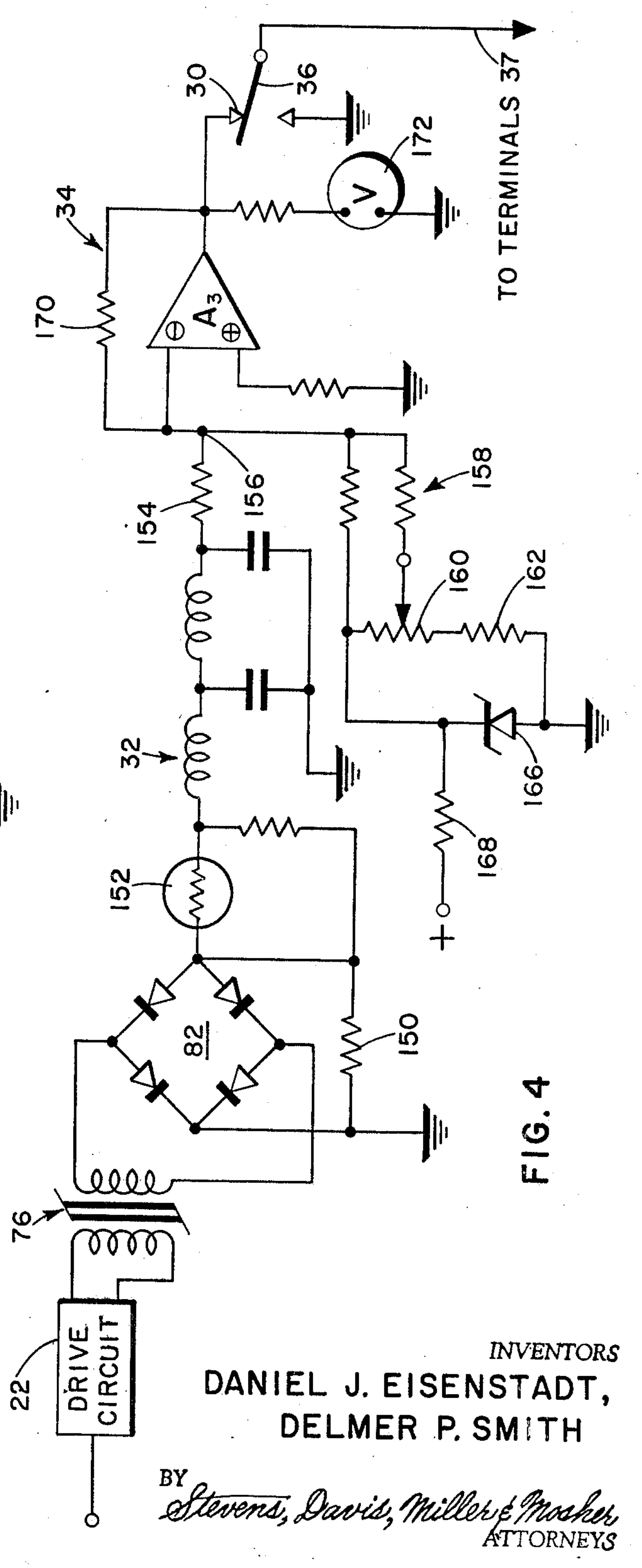
FIGURE 4 is a schematic illustration reference channel.

As mentioned above, the forward sections of the reference channel are the same as the sections in each data channel up to the square wave generator 24. The pass band filter in the reference channel is designed with its center frequency equal to the reference frequency in use. The pass band is normally 7½% based on a maximum tape speed error of plus or minus 3%. The broader pass band reduces time delay in the reference discriminator channel and under certain circumstances allows correction of speed errors greater than plus or minus 3%. With reference to FIGURE 4, the Magmeter of the reference channel differs from that in each of data channels in that the fifth diode is not required and instead a resistor 150 is connected to the diode bridge output terminal and the terminal opposite thereto. The Magmeter applies its output through thermister 152 to low pass filter 32 which unlike the active low pass filters in the data channels is in the form of a completely passive, four-pole, maximally flat delay configuration with fixed low pass characteristics. The low pass output is coupled through resistor 154 to the inverting input of operational type DC coupled output amplifier 83. When the reference signal input is at center frequency, the current to terminal 156 for low pass filter 32 will have a known value such as approximately 0.2 ma. In order to provide reference channel zero output at center frequency (zero tape speed error) an equal and opposite current is provided at terminal 156 by resistive network 158 having a variable potentiometer 160 acting, in cooperation with resistor 162, as a voltage divider connected to a reference voltage at terminal 164 (such as a plus nine volt reference) developed by Zener diode 166 in series with resistor 168 connected to the positive power supply.

The net current signal at terminal 156 is fed to the input of amplifier $A_3$ the gain of which is determined by feedback resistor 170. In the present example, overall discriminator gain characteristic is 876 mv. per percent deviation of the input frequency. It is preferred that the gain be factory set and no adjustment be provided. The output of amplifier $A_3$ which is monitored by meter 172 is fed to the output of the reference channel through switch 30. Switch 30 can be connected to ground in the event error compensation is not desired. Thus, as better seen in FIGURE 1, when switch 36 is connected to terminal 30, the output of the reference discriminator channel is applied to the paralleled tape-speed compensation inputs 37 of all data channels. When switch 36 is in the ground position, the inputs to all delay matching circuits of the data channels are connected to the system common ground. Since the output impedances of amplifier $A_3$ is near zero and the output voltage is zero at the reference frequency, the data discriminators continue to operate in exactly the same manner as if switch 36 were connected to the output amplifier $A_3$ and the reference channel were receiving a reference signal at center frequency. The ground terminal for switch 36 is normally used when there is no available reference signal.

The DC amplifier $A_3$ is of conventional design and preferably includes phase compensation networks to provide close loop stability with no effect on the system frequency response. Amplifier $A_3$ should also have the characteristic of being temperature compensated and have input transistors thermally matched for low drift and have a relatively high power output so as to drive simultaneously a large number of data channels.

One example of the reference discriminator channel designed for operation at 100 kHz. exhibits an overall group delay of 104 microseconds.

When all data channels operate within frequency bands less than the reference signal, switch 12 feeds the composite signal directly to the data channel inputs. In the case of reference signal 100 kHz., the total delay through the reference channel is 104 microseconds. The delay through the data channels up to the diode bridge circuits of the square wave generator 24 is by design greater than or at the highest data frequencies equal to 104 microseconds. Thus, in order to synchronize the error signal from the reference channel with the instantaneous corresponding part of the subcarrier, an additional delay is imparted to the error signal by the delay matching circuit 38. For any given data channel, this network is fixed at the value required to match the time delay of 100 kHz. reference channel. When lower reference frequencies are employed with correspondingly longer delays to the reference channel, it is necessary to insert a signal delay unit into the data discriminator input as mentioned below.

In the event the reference signal is below 100 kHz., and since the data channel discriminators incorporate delay matching networks 38 based on the use of a 100 kHz. reference channel, the total delay to the compensation circuit becomes unequal to the delay to the data channel. But the use of a lower reference signal than that designed for the reference channel is compensated by the provisions of a delay line 14 which is placed in series with the playback unit output by operation of switch 12.

Since the delay through the reference channel set for 100 kHz. is 104 microseconds and a delay experienced by the actual lower frequency reference signal is equal to $$\frac{100 kHz. \times 104\ \mu s.}{\text{Actual Ref. Freq. } (kHz.)}$$

it can be seen that for lower reference frequencies, delay unit 14 should be designed to impart a delay indicated in the above expression minus 104 microseconds. For example, the delay to a 25 kHz. reference channel discriminator is equal to $$\frac{100\ kHz. \times 104\ \mu s.}{25\ kHz.} = 416\ \mu s.$$

Accordingly, delay unit 14 should be designed for a delay of 416−104=312 microseconds, in order to achieve the correct time correlations in the tape speed compensation.

Delay line 14 may take any suitable form such as a lumped constant artificial transmission line utilizing an appropriate number of capacitors and inductors. An emitter follower may be used at the input to present high input impedance and line losses may be overcome by utilizing an output amplifier set for unity gain throughout the applicable frequency range so that sensitivity and dynamic range of the data channel discriminators are not degraded.

Error compensation

With reference to FIGURES 1 and 2, since the compensation signal from the reference channel is passed through a delay matching network 38, the error signal is attenuated, for example by 12 db, before reaching the associated square wave generator 24. With this attenuation the net error signal fed to diode 86 is 200 mv. per percent deviation of the reference frequency. Since the maximum tape speed variation is plus or minus 3%, the maximum error voltage applied to diode 86 is plus or minus 600 mv. This error signal, which is developed across resistor 160, is applied to the diode bridge 82 in such a way so that two of the bridge diodes are in series with the diode 86. When the error signal across resistor 160 is positive with respect to common, the diodes are back biased but when this voltage is negative, the three series diodes tend to conduct. However, since the diodes are silicon-type diodes with forward voltage of 0.6 volt or about 1.8 volts total with a maximum voltage of —600 mv. across resistor 160, it can be seen that only a minute current flows through the diodes as a result of compensation voltage alone. One purpose of diode 86 is to lower the leakage current when the error compensation signal across resistor 160 is negative.

Figure 5:
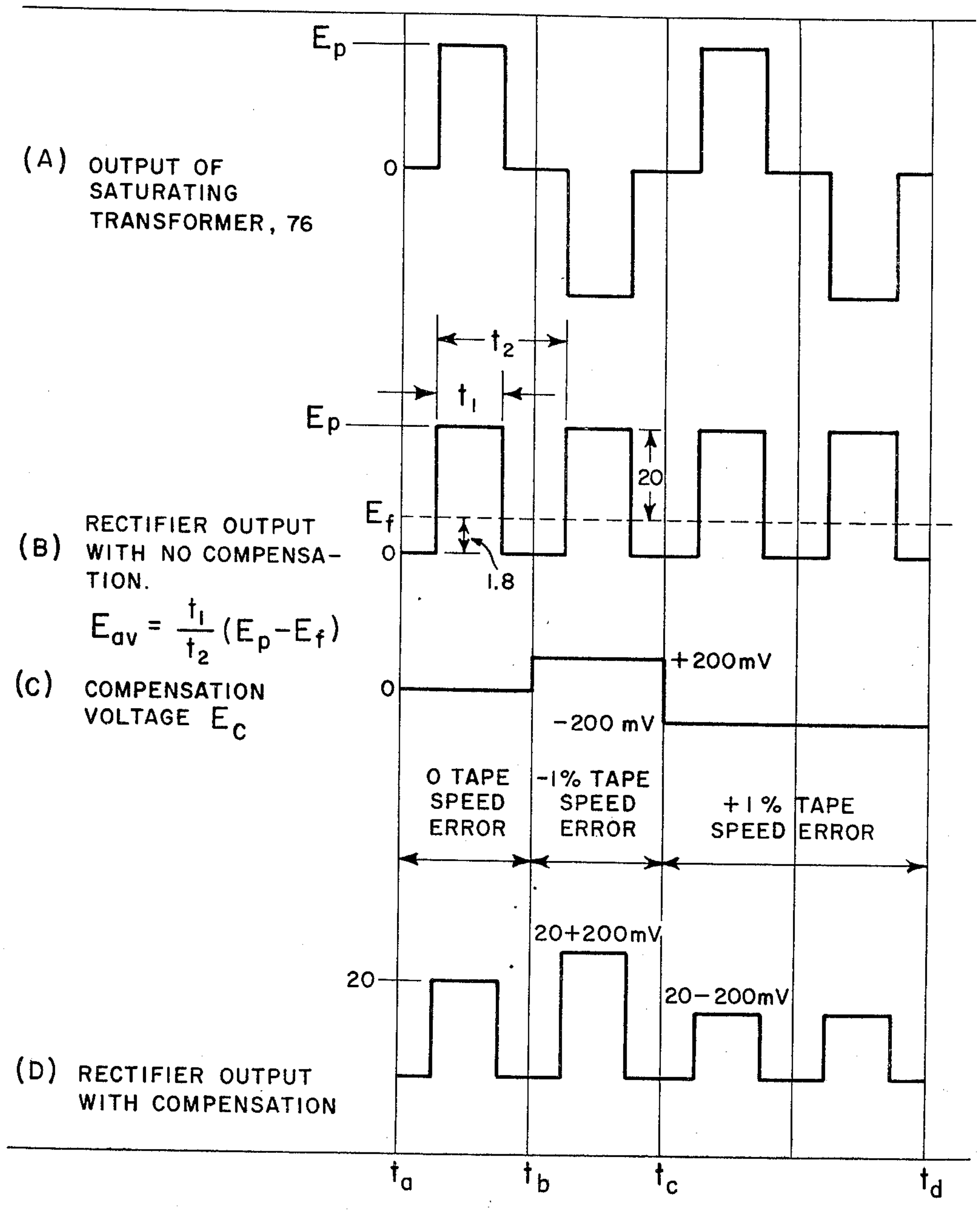
FIGURE 5 represents signal waveforms developed in the square wave generator as well as at the output of the delay matching network.

FIGURE 5 shows an idealized operation of the error compensation technique employed by the present invention. Signal A represents the output wave form of the secondary of saturating transformer 76. Signal B represents the uncompensated rectified wave form developed by diode bridge 82 and due to the forward drop of the diodes only that portion of the wave form above the dotted line actually appears at the bridge output 86. By virtue of the design, $E_p$ is fixed at 21.8 volts and $T_1/T_2$ is 0.5 at center frequency. $E_f$, the diode forward drop, is 1.8 volts. Thus the average output $(T_1/T_2)$ $(E_p-E_f)$ is 10 volts DC at center frequency. During time $T_1$, when the diodes are gated on by the saturating transformer 76, compensation voltage $E_c$ across resistor 160 is summed with the wave form signal B. As stated above, during the time other than $T_1$, $E_c$ has no significant effect on the output of bridge 82.

In the illustration, tape speed error during time interval $t_a$, $t_b$ is zero; thus, the compensating voltage is zero and the output pulse (signal D) is equal to $E_p-E_f$. During time $t_b$, $t_c$, it is assumed that tape speed has fallen 1% resulting in a 200 mv. signal across resistor 160 which adds to waveform and results in an increased pulse height of signal D. From $t_c$ to $t_d$, it is assumed that tape speed has increased by 1%. Reference discriminator output polarity reverses and now the compensation voltage subtracts from the pulse height as shown by signal D. As indicated below, the compensation signal arrives at the summing point at precisely the same time as the error which it is meant to correct by virtue of delay matching circuit 38 formed by inductors 162, 164, resistors 166, 168 and capacitor 170, having maximally flat delay and low pass characteristics.

At first reading it may appear that a correction voltage is merely being added to the Magmeter voltage. Such a compensation technique could operate correctly only at a fixed frequency. Errors would mount rapidly as the carrier frequency was deviated. In the present system, the average output voltage is:

$$\frac{t_1}{t_2}E_p+E_c$$

or since $$\frac{1}{t_2}=F$$

where F equals 2× carrier frequency, $$E_{av}=t_1F(E_p+E_c)=F_{t_1}\cdot E_p+F_{t_1}\cdot E_c$$

Polarities of the signals illustrated in FIGURE 4 are inverted for simplicity of presentation.

Thus, there has been described a new and improved system for handling frequency modulated signals to develop error compensated frequency discriminator output signals representative of information imparted to a plurality of subcarrier signals. It should be understood that various modifications can be made to the herein disclosed examples of the present invention without departing from the spirit and scope thereof.

What is claimed is:

1. In an information processing system for reproducing information from a frequency modulated data signal recorded on a medium upon which there is also recorded a reference signal, the data and reference signals being subject to erroneous and mutual frequency modulations, the improvement comprising a data frequency discriminator including first means receiving the data signal and producing a train of constant amplitude, constant width square wave pulses having the same polarity and occurring at a repetition rate corresponding to the frequency of the data signal, second means receiving the pulse train and producing an output signal representative of the average or integrated energy content of the pulse train and thereby representative of the information content of the data signal, and reference discriminator means for receiving the reference signal and producing an error signal representative of the error component of the data signal and applying the error signal to said first means which is adapted to algebraically add the same to the amplitudes of the pulses in the train thus linearly compensating for the error by increasing or decreasing the energy content thereof, said reference discriminator applying an error signal generally for the full period of the square wave developed by said first means, and said first means including error signal control means for preventing the error signal from significantly affecting the energy content of the square wave except during generation of a constant amplitude, constant width pulse, passive delay means coupled from said reference discriminator to the error signal control means to synchronize the error signal and the time associated part of the data signal, said first means including a saturable square loop transformer, a drive circuit coupled to drive said transformer into forward or reverse saturation in less than one-half the period of the data signal so as to produce pulses each having an amplitude and width independent of the data signal frequency, and a full wave rectifier connected to receive the secondary output of the transformer for making the polarity of all pulses in the train the same, whereby the rectifier output signal has twice the frequency of the data signal.

2. A system as set forth in claim 1 wherein said full wave rectifier comprises a diode bridge having each of two input terminals connected to each of the transformer secondary terminals, a third terminal of the bridge being an output terminal, and said error signal control means including an additional diode coupled from the passive delay means to the diode bridge fourth terminal and poled the same as the diodes in each leg connected from the fourth to the third bridge terminals.

3. In an information processing system for reproducing information from a frequency modulated data signal recorded on a medium upon which there is also recorded a reference signal, the data and reference signals being subject to erroneous and mutual frequency modulations, the improvement comprising a data frequency discriminator including first means receiving the data signal and producing a train of constant amplitude, constant width square wave pulses having the same polarity and occurring at a repetition rate corresponding to the frequency of the data signal, second means receiving the pulse train and producing an output signal representative of the average or integrated energy content of the pulse train and thereby representative of the information content of the data signal, and reference discriminator means for receiving the reference signal and producing an error signal representative of the error component of the data signal and applying the error signal to said first means which is adapted to algebraically add the same to the amplitudes of the pulses in the train thus linearly compensating for the error by increasing or decreasing the energy content thereof, said first means including a saturable square loop transformer, a drive circuit coupled to drive the transformer into forward or reverse saturation in less than one-half the period of the data signal so as to produce pulses on the transformer secondary each having an amplitude and width independent on the data signal frequency and a repetition rate corresponding to the data signal frequency, a full wave rectifier coupled to the transformer secondary to make the polarity of the pulses thereon the same, and means applying the error signal so as to algebraically add the same to the amplitude of the pulses at a location following the transformer secondary and before said second means.

4. In an information processing system for reproducing information from a frequency modulated data signal recorded on a medium upon which there is recorded a reference signal, the data and reference signals being subject to erroneous and mutual frequency modulations, the improvement comprising a data frequency discriminator including first means receiving the data signal and producing a train of constant amplitude, constant width square wave pulses having the same polarity and occurring at a repetition rate corresponding to the frequency of the data signal, second means receiving the pulse train and producing an output signal representative of the average or integrated energy content of the pulse train and thereby representative of the information content of the data signal, and reference discriminator means for receiving the reference signal and producing an error signal representative of the error component of the data signal and applying the error signal to said first means which is adapted to algebraically add the same to the amplitudes of the pulses in the train thus linearly compensating for the error by increasing or decreasing the energy content thereof, said first means including a saturable square loop transformer, a drive circuit coupled to drive said transformer into forward or reverse saturation in less than one-half the period of the data signal so as to produce pulses each having an amplitude and width independent of the data signal frequency, and a full wave rectifier connected to receive the secondary output of the transformer for making the polarity of all pulses in the train the same whereby the rectifier output signal has twice the frequency as the data signal.

5. A system as set forth in claim 4 wherein delay means are provided to delay the data signal before it is applied to said data frequency discriminator.

6. An information processing system comprising a playback unit for reading a recording medium and producing a composite signal including a reference signal prerecorded at a fixed frequency and a plurality of prerecorded frequency modulated data signals having center frequencies spaced from each other and the reference signal frequency, the reference and data signals being subject to erroneous and mutual frequency modulations by reason of recording or playback speed variations, a plurality of data channel frequency discriminators and a reference channel frequency discriminator coupled to receive the composite signal and each including a band pass filter for selecting the appropriate data signal, a limiter receiving the filtered signal and generating a square wave pulse train with the same frequency as the filtered signal, a multivibrator drive circuit receiving the pulse train and coupled to a square loop saturable transformer for driving the same into alternately forward and reverse saturation so as to produce constant amplitude, constant width square wave pulses of alternately opposite sign on the transformer secondary, said transformer saturating in each direction in a time less than one-half the period of the associated data or reference signal, a full wave rectifying diode bridge having two opposite terminals coupled to opposite terminals of the transformer secondary for producing at its output terminal a train of square wave pulses having the same polarity but a frequency twice the received data or reference signal, low pass filter and DC amplifier means coupled to the output of said bridge for integrating the energy content of the pulse received therefrom, amplifying the integrated value and applying to the corresponding channel output terminal the resulting DC signal, adjustable means coupled to said low pass filter and DC amplifier means for setting the DC signal magnitude at a predetermined value when the received reference or data signal is at its center or fixed frequency, respectively, each said data discriminators further comprising a delay matching network having its input connected to the reference channel output terminal and applying its output signal to a fifth diode connected to the fourth terminal of the diode bridge and poled the same as the diodes in each bridge leg between the fourth and output bridge terminals so as to algebraically add the error signal to the pulse amplitudes therein to error compensate the energy content thereof, said bridge and fifth diodes having a forward voltage drop to prevent significant error signal effect except during pulse generation.

7. A system as set forth in claim 6 wherein the composite signal is fed to a delay circuit the output of which is applied to the data channel inputs.

8. A system as set forth in claim 6 wherein each data and reference frequency discriminator includes a phase splitter and buffer stage connected from the respective channel input terminal to the band pass filter.

9. A system as set forth in claim 6 wherein said adjustable means comprises a Zener diode coupled to a power supply and another voltage level to produce at one of its terminals a predetermined voltage magnitude and a voltage divider including a potentiometer connected in parallel with said Zener diode to apply an adjustable voltage to said low pass filter and DC amplifier means.

10. A system as set forth in claim 6 wherein said low pass filter and DC amplifier means in the data channels comprises an active three pole low pass filter.

References Cited

UNITED STATES PATENTS 3,339,192 10/1967 Zeller ------------ 179—100.2

STANLEY M. URYNOWICZ, Jr., Primary Examiner

J. ROSENBLATT, Assistant Examiner

U.S. Cl. X.R.

179—100.2